(12) United States Patent
Kampmann

(10) Patent No.: US 10,735,330 B2
(45) Date of Patent: Aug. 4, 2020

(54) SERVICE APPLICATION WITH LEARNING CAPABILITY

(71) Applicant: Telefonaktiebolaget LM Ericsson (publ), Stockholm (SE)

(72) Inventor: Dirk Kampmann, Vaals (NL)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 523 days.

(21) Appl. No.: 15/305,385

(22) PCT Filed: May 9, 2014

(86) PCT No.: PCT/EP2014/059532
§ 371 (c)(1),
(2) Date: Oct. 20, 2016

(87) PCT Pub. No.: WO2015/169386
PCT Pub. Date: Nov. 12, 2015

(65) Prior Publication Data
US 2017/0048152 A1 Feb. 16, 2017

(51) Int. Cl.
*H04L 12/851* (2013.01)
*H04L 12/725* (2013.01)
*H04L 29/06* (2006.01)

(52) U.S. Cl.
CPC ........ *H04L 47/2441* (2013.01); *H04L 45/306* (2013.01); *H04L 69/16* (2013.01)

(58) Field of Classification Search
CPC .................................................. H04L 47/2441
See application file for complete search history.

(56) References Cited

U.S. PATENT DOCUMENTS

| 2012/0084423 A1* | 4/2012 | McGleenon | ........ H04L 61/1511 709/223 |
| 2012/0084460 A1* | 4/2012 | McGinnity | ........... H04L 67/322 709/242 |

(Continued)

OTHER PUBLICATIONS

European Office Action issued in corresponding EP Application No. 14723420.7 dated Jan. 29, 2019, 05 pages. The reference cited therein has been previously made of record.

*Primary Examiner* — Kodzovi Acolatse
*Assistant Examiner* — Abdeltif Ajid
(74) *Attorney, Agent, or Firm* — Patent Portfolio Builders, PLLC

(57) ABSTRACT

The present invention relates to a method, by a target node classification entity (100), to control an application of a service providing module (50) to a data packet flow, wherein the data packet flow is transmitted to a target node (310, 320) through a service network where the service providing module (50) applies a service to the data packet flow. The method comprises the following steps: First, from a flow classification entity (40), flow classification data about the data packet flow is received, the flow classification data including at least a flow classifier classifying the data packet flow, a flow identifier uniquely identifying the data packet flow, and a target node address to which the data packet flow is addressed. Then, the target node is classified based on the flow classifier contained in the received flow classification data, wherein a first service classifier is generated for the target node based on the flow classifier. Then, it is checked whether a classification database (120) has to be updated based on the first classifier of the target node, the classification database storing, for different target nodes, whether at least one service has to be applied to data packet flows to the corresponding target node. Furthermore, if the information in the classification database has to be updated, a flow (Continued)

command is generated for a central flow controller (200) which controls the data packet flows through the service network, wherein the generated flow command contains the information that successive data packet flows in the service network transmitted to the target node address should be passed through the service network in accordance with the generated first service classifier of the target node, and the generated flow command is transmitted to the central flow controller (200).

23 Claims, 9 Drawing Sheets

(56) References Cited

U.S. PATENT DOCUMENTS

| | | | | |
|---|---|---|---|---|
| 2013/0060964 A1* | 3/2013 | Shahar | ................ | H04L 45/306 709/244 |
| 2015/0195197 A1* | 7/2015 | Yong | ..................... | H04L 45/74 370/392 |

* cited by examiner

SERVICE APPLICATION WITH LEARNING CAPABILITY

TECHNICAL FIELD

The invention relates to a method to control an application of a service providing module to a data packet flow carried out by a target node classification entity and to a corresponding target node classification entity. The invention furthermore relates to a method for controlling data packet flows in a service network by a central flow controller and to the central flow controller, to a computer program, to a computer program product and to a carrier containing a computer program.

BACKGROUND

The function of 'Service Chaining' is well known and various solutions are described. This function provides the means to steer subscriber traffic (e.g. mobile subscriber traffic or fixed subscriber traffic) through a set of predefined service nodes that adds value to the flow processing either to the advantage of the operator or to the advantage of the subscriber, or both.

As an example the following use cases are given:

Parental Control: the subscriber requested a 'Parental Control' service from the operator. All traffic from the subscriber is passed through a service node providing 'parental control' function, for example the service filters traffic to prohibited web-pages.

Header Enrichment: for internal purposed (e.g. simplified subscriber authentication, statistic, charging) the operator wants to enrich each HTTP request with additional information. Therefore, all traffic is sent through a Header Enrichment service before it is passed forward to the target specified in the packet.

Note that in both use cases listed above and in general for all service chaining use cases the traffic flow is sent to a target node that is not identical with the service node. One service chaining solution uses the capability of SDN (Software Defined Networks) to dynamically associate traffic flows, i.e. data packet flows, to specific service chains. In this case the operator can define sequences of services (service chains) and how subscriber flows shall be mapped to those service chains. Then the traffic flow is steered by the SDN solution based on subscriber subscription information, subscriber session information, or other information to the appropriate service node.

Preferably a service node as service providing module shall only process 'relevant' traffic. That means only traffic that can be treated in the service should be sent to the service node. For example: only video traffic should be sent to a video optimizer. Any non-video traffic should by-pass the video optimizer.

Some services intercept the traffic flows in a way that they cannot be removed form a service chain without interrupting the end-to-end connection. For example a service may intercept a TCP (Transmission Control Protocol) connection and establishes separate TCP connections towards the subscriber and the target originally addressed by the subscriber. In this case the service cannot be removed for the connection without interrupting it. As a consequence the subscriber may reestablish a new connection but then this new flow is again intercepted by the service. If the service shall be removed again then the situation is the same as before: removing the service is not possible without interrupting the end-to-end connection. Such a service is called in the following a non-TCP-transparent service.

Further the specific traffic type is frequently not known at flow establishment. For example if a flow is a video flow is only known after a DPI (Deep Packet Inspection) device investigated the first packets of the flow.

In the following it is assumed that the operator owns a non-TCP-transparent service and he expects that only relevant traffic shall be sent to the service providing module. However in this case it is assumed that the first packets of a flow have to be inspected in order to decide if traffic is relevant for the service or not. An example of such a service is a video optimizer. It is assumed that first the traffic is sent through DPI and the non-TCP-transparent service, here a video optimizer. As soon as DPI classifies the traffic as non-video it is not possible anymore to remove the service from the chain.

Assuming that first the traffic is sent through the DPI but bypasses the non-TCP-transparent service. As soon as the DPI classifies the traffic as video traffic it can change the service chain and send the flow through the non-TCP-transparent service. However, the TCP connection is already established. It is questionable if the service can intercept the connection. Further, in case of a video optimizer, this service would need the first frames sent at the start of a connection to act correctly because some video stream contains important information about the stream that are needed for optimization. As a consequence the video optimizer likely fails to work when the flow is sent to the video optimizer after connection establishment.

It shall be understood that due to the fact that today traffic is frequently cached in a network it is not obvious if a packet destination is a video server or not. In addition, the destination of a packet may provide video service in some cases and non-video service in other cases. Consequently traffic cannot be steered to a service, for example video optimizer, just based on destination address.

In view of the above said, a need exists to enhance the insertion or removal of a service provided by a service providing module for a data packet flow in a service network.

SUMMARY

This need is met by the features of the independent claims. Additional features are described in the dependent claims.

According to a first aspect of the invention, a method is provided by a target node classification entity to control an application of a service providing module to a data packet flow, wherein the data packet flow is transmitted to the target node through a service network where the service providing module applies a service to the data packet flow. Flow classification data about the data packet flow is received from a flow classification entity, wherein the flow classification data include at least a flow classifier classifying the data packet flow and a flow identifier uniquely identifying the data packet flow. Furthermore, the flow classification data include a target node address to which the data packet flow is addressed. The target node to which the data packet flow is transmitted is classified based on the flow classifier contained in the received flow classification data, wherein a first service classifier is generated for the target node based on the flow classifier. It is then checked whether a classification database has to be updated based on the first classifier of the target node. The classification database stores, for different target nodes, whether and/or which at least one service has to be applied to data packet flows to the corresponding target node. If the information in the classification database has to be updated, a flow command for a central flow controller which controls the data packet flows through the service network is generated, wherein the generated flow command contains the information that successive data packet flows in the service network transmitted to the target node address should be passed through the service network in accordance with the generated first service classifier of the target node. The generated flow command is transmitted to the central flow controller.

With this method of the target node classification entity a learning capability is introduced that allows the insertion or removal of a service providing module into a flow path of a data packet flow. Based on the fact that many data packet flows that shall receive a specific service are sent to the same destination or target node, the target node classification entity can learn which service should or should not be applied to data packet flows to this target node. The generated flow command transmitted to the central flow controller can then be used by the latter to adapt the flow path for successive data packet flows, so that future data packet flows to the same target node will be passed through the service network in accordance with the flow classification.

Preferably, the generated flow command furthermore contains the information that a path for the data packet flow identified by the flow identifier contained in the flow classification data through the service network should not be amended. This means that the generated flow command contains the information that future or successive data packet flows transmitted to the target node address should be passed through the service network in accordance with the generated first service classifier whereas the data packet flow which was used for generating the flow command is not amended. The flow path for the identified flow is preferably not amended as the service cannot be removed for the connection without interrupting the flow. The target node classification entity learns if a target is a target node for which a certain service is needed or not, e.g. whether the target node is a video server or not or any other server for which the application of a service to the flows is considered necessary, and this information is used to steer subsequent flows with the same destination either through the service providing module or to bypass this service. However, it should be understood that the invention is not restricted to video traffic where the service providing module is a video optimizer. The service providing module can be used in connection with any other service for which the removing of a service is not possible without interrupting the end-to-end connection and for which a target node classification can be applied based on a flow classification.

The invention furthermore relates to the corresponding target node classification entity which works as described above, comprising a processing unit and a memory, the memory containing instructions executable by the processor whereby the apparatus is operative to work as described above.

The target node classification entity comprises a receiver configured to receive from the flow classification entity the flow classification data about the data packet flow, the flow classification data including at least the flow classifier, the flow identifier and the target node address. The processing unit is configured or adapted to classify the target node based on the flow classifier contained in the received flow classification data and is configured to generate a first service classifier for the target node based on the flow classifier. The processing unit is furthermore configured to check whether a classification database has to be updated based on the first classifier of the target node. If the processing unit determines that the information in the classification database has to be updated, the processing unit is configured or adapted to generate a flow command for the central flow controller which controls the data packet flows through the service network. The generated flow command contains information that successive data packet flows in the service network transmitted to the target node address should be passed through the service network in accordance with the generated first service classifier of the target node. A transmitter of the target node classification entity can transmit the generated flow command to the central flow controller.

According to a further aspect, a method for controlling data packet flows by a central flow controller in a service network, in which service providing module apply services to data packet flows is provided and the data packet flows are transmitted through the service network to a target node based on a first service classifier of the target node. A flow command is received from the target node classification entity, the flow command containing the information that successive data packet flows in the service network transmitted to the target node should be passed through the service network in agreement with a first service classifier of the target node contained in the flow command. Based on the received flow command an updated path for the successive data packet flows to the target node is determined in accordance with the received flow command, and the forwarding elements in the service network which forward the data packet flows in the service network are programmed in such a way that successive data packet flows to the target node follow the updated path.

The central flow controller can calculate an updated path for these flows. The central flow controller, based on the received flow command, knows how to steer the traffic flow through the service network in order to apply the requested services to the data flow. The central flow controller does not know about services and does not know which services should be applied to a data packet flow. The central flow controller is told, based on the received flow commands, to which egress ports traffic shall be forwarded. The egress ports are connected to the services.

Furthermore, the flow command can contain a flow identifier and the information that a path for the data packet flow identified by the flow identifier through the service network should not be amended. The forwarding elements in the service network are then programmed in such a way that the path of the data packet flow through the service network identified with the received flow identifier remains unchanged.

The invention furthermore relates to the corresponding central flow controller comprising a receiver configured to receive the flow command from the target node classification entity, the central flow controller furthermore comprising a processing unit configured to determine, based on the received flow command, an updated path for successive data packet flows to the target node in accordance with the received flow command. The processing unit is furthermore configured to program the forwarding elements in the service network which forward the data packet flows in the service network in such a way that successive data packet flows to the target node follow the updated path.

The invention furthermore relates to a computer program comprising instructions, when executed on at least one processor, cause the at least one processor to carry out the above described methods. Furthermore, a computer program product comprising a computer program as described above and a carrier containing the computer program is provided.

It should be understood that each of the features described above or below can be used in the described context. However, each feature can also be used alone or in combination with any of the other features described above or below.

Details of the invention and further embodiments will be apparent from the following detailed description.

DETAILED DESCRIPTION OF EMBODIMENTS

In the following, concepts according to embodiments of the invention will be explained in more detail by referring to the accompanying drawings.

In the following description reference is made inter alia to a video optimizer as an example of a service providing module. However, it should be understood that any other service providing module can be used, such as NAPT (Network Address and Port Translation) and FW (Firewall).

The present invention provides a learning capability that allows the insertion or removal of a service providing module of a non-transparent service from a service chain. The service chain can comprise one or several service providing modules through which a data packet flow is transmitted. The invention is based on the fact that many flows that shall receive a specific service, here the video optimization, are sent to the same destination or to a set of destinations identified inter alia by IP address and TCP port. Of course, there are many different video servers or service providing modules in the network. A central flow controller which controls the service chaining learns if a target is video server or not or is a server for which the application of a certain service providing module is necessary or not, and the central flow controller will use this information to steer subsequent flows with the same destination either through the service providing module/video optimizer or to bypass this service.

Figure 1:
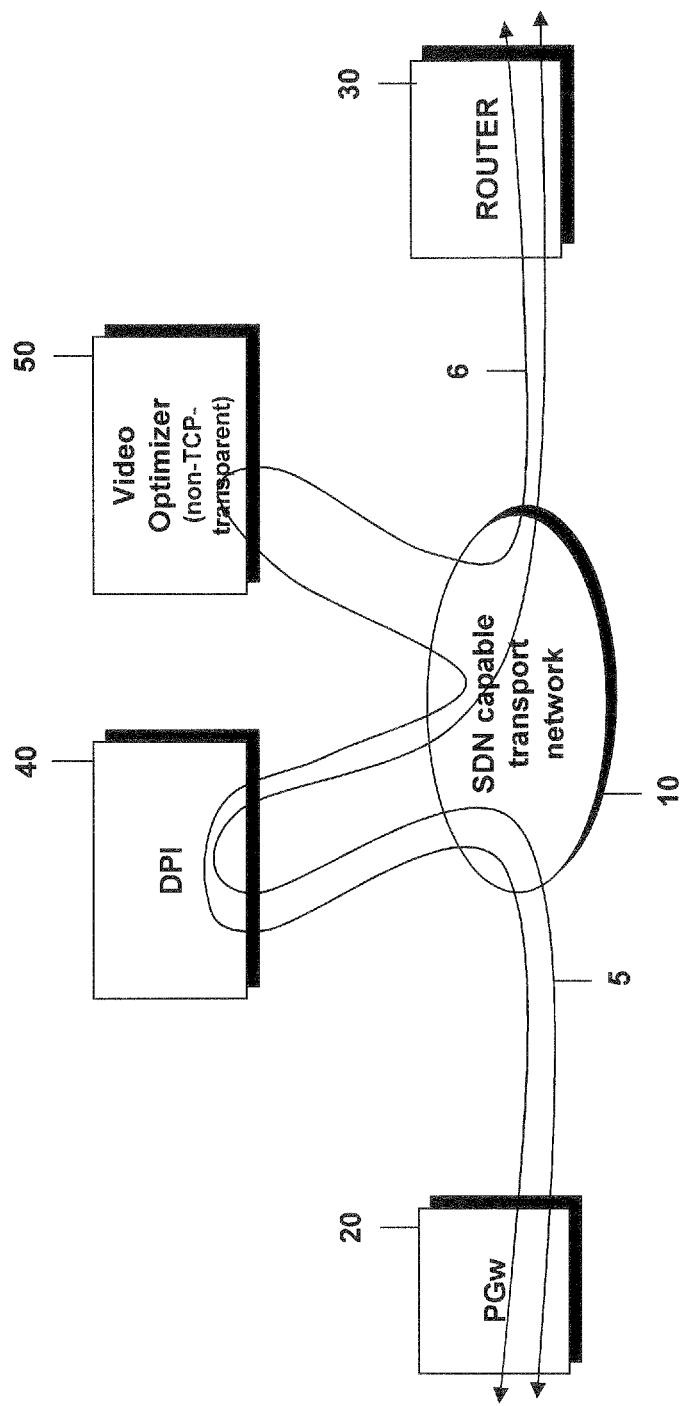
FIG. 1 schematically illustrates a scenario in which data packet flows in a service network are passed through a service providing module, here a video optimizer, only when the destination is classified as a target node for which it is positively known that the service should be provided.

In connection with FIG. 1 a first example is explained in which the invention can be applied. In the example of FIG. 1, a flow with an unknown, not yet classified target address is sent through a packet inspection entity 40 and the data flows bypass the service providing module 50, here the video optimizer. When the packet inspection entity 40 identifies that the flow is a video flow, then all subsequent flows to the same target node are sent through the video optimizer.

In FIG. 1, an SDN capable transport network 10 is part of a service providing network where service providing modules such as the video optimizer 50, as an example, apply a video optimization as a service to the data packet flow. Data packet flows from a packet gateway 20 to a router 30 or vice versa are sent through the service providing network. A data packet flow 5 for which the target node is not known or is not classified passes through the packet inspection entity (deep packet inspection, DPI) 40, but does not pass through the video optimizer 50. When the target node is classified as a video server, the data flow 6 to this target node is passed through the service providing module 50. Thus, in the embodiments disclosed in connection with FIG. 1 and the embodiments shown in FIGS. 2 and 3, a default flow path exists in which data packet flows are passed through the packet inspection entity 40, but not through the service providing module, here the video optimizer 50. The default path is the path of the data packet flows that all data packet flows will follows if there is no exception specified that a data packet flow to a destination should not follow this default path.

Figure 4:
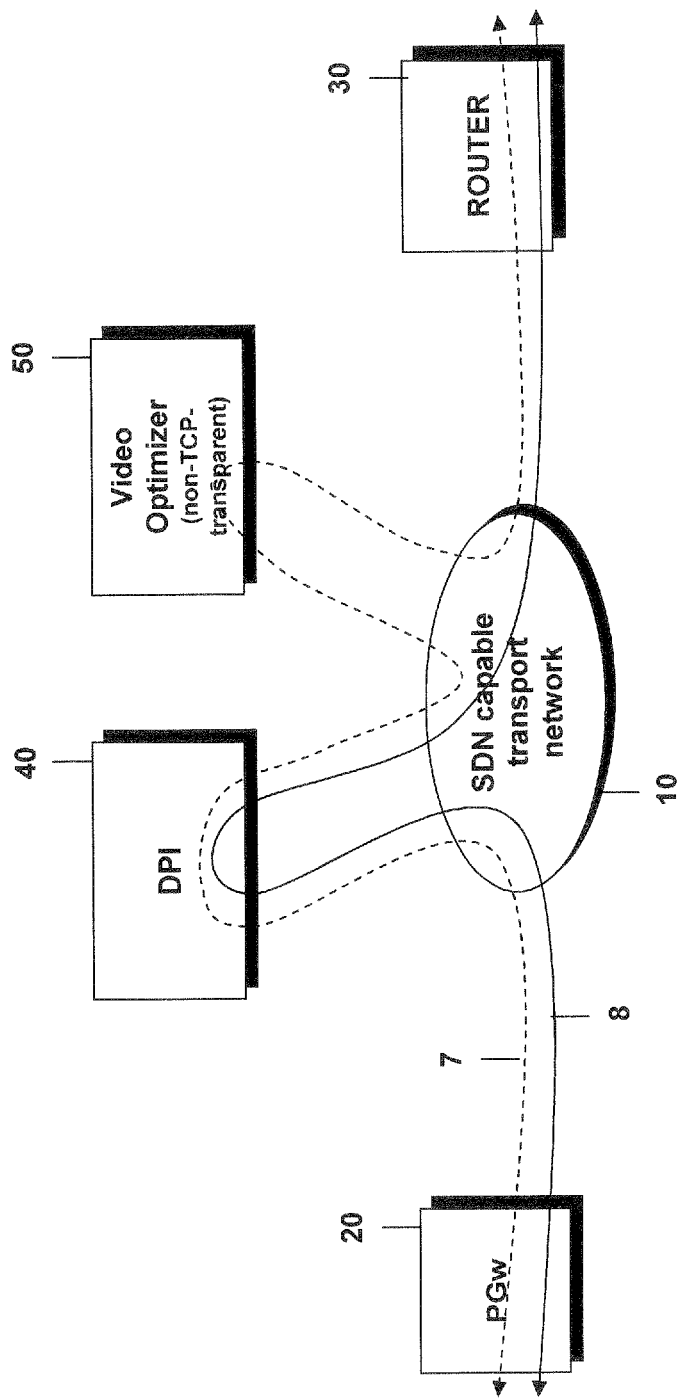
FIG. 4 schematically illustrates a scenario where data packet flows with unknown destinations are per default passed through the service providing module.
Figure 5:
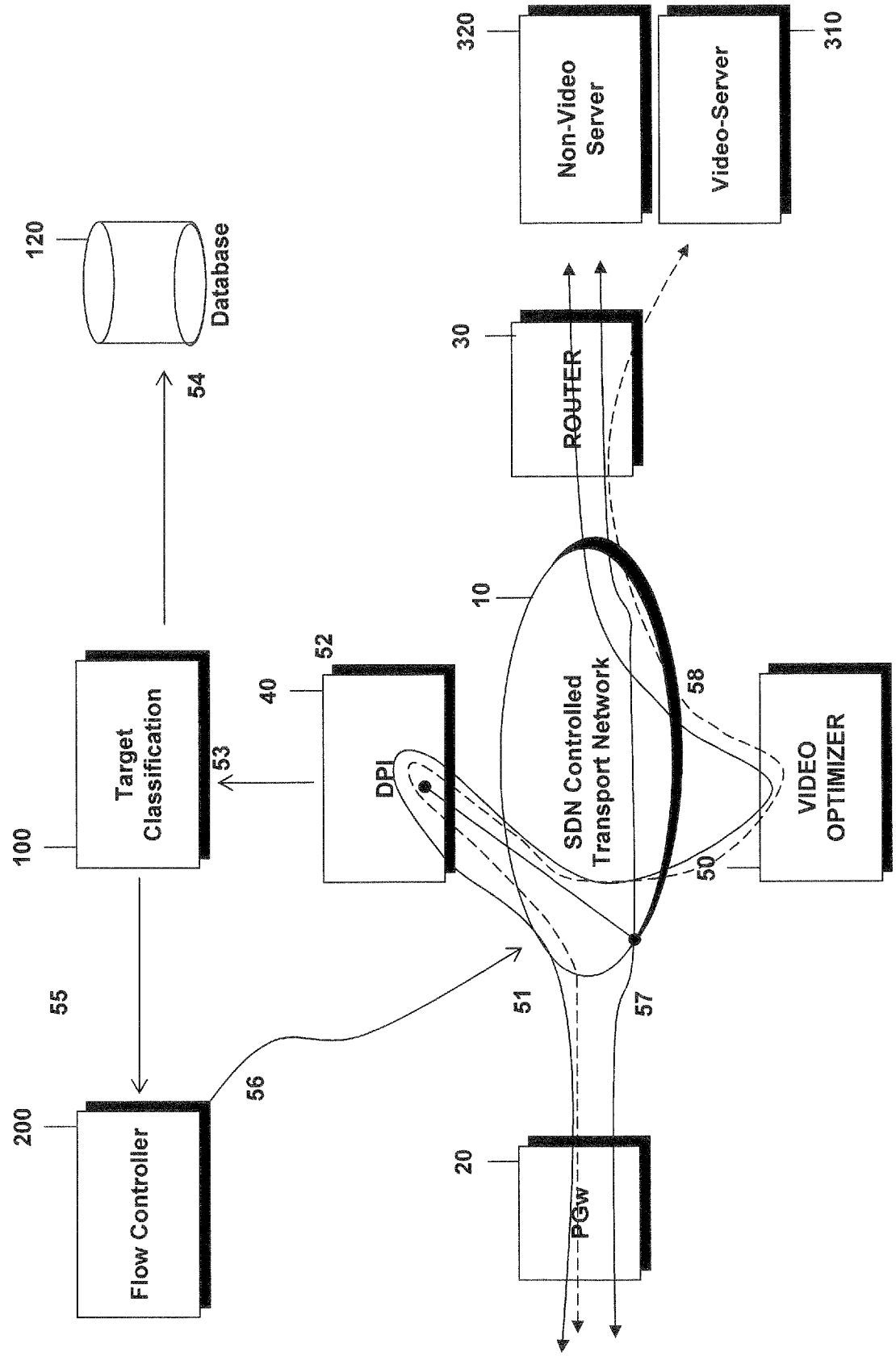
FIG. 5 schematically illustrates a message exchange incorporating features of the invention in the system shown in FIG. 4 when it is detected that data packet flows to a target node should not be passed through the service providing module anymore.
Figure 6:
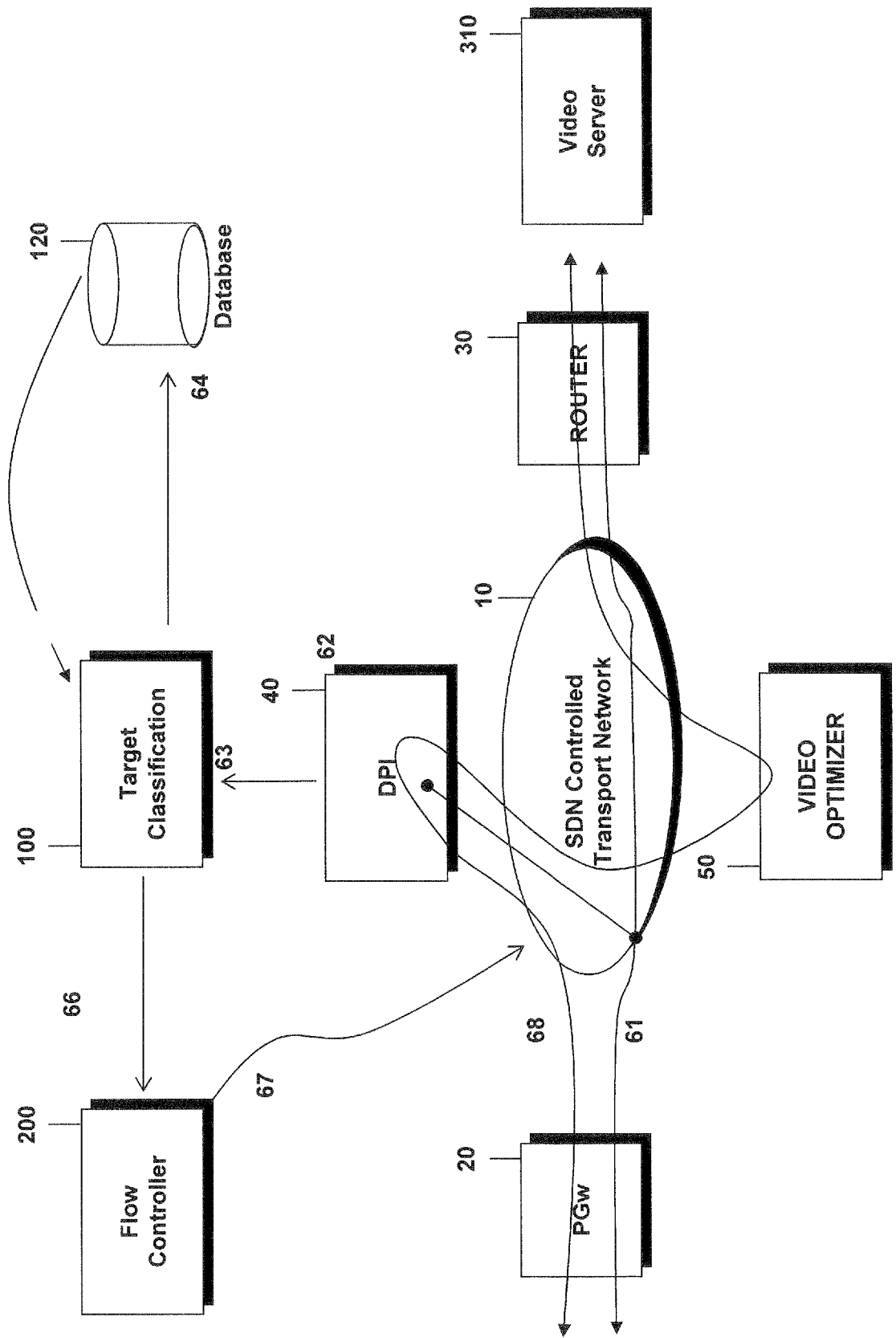
FIG. 6 schematically illustrates the message exchange in the system of FIG. 4 when the nature of the target node changes again and the flow should be converted back to the default flow steering.

In the embodiments shown in FIGS. 4-6, the situation is different as a flow with an unknown or not yet classified target node is sent through the packet inspection entity 40 and the service providing module such as the video optimizer 50. When the packet inspection entity 40 identifies that the flow is not a video flow, then all subsequent flows with the same target are bypassing the service providing module. Thus, in the embodiments described in FIGS. 4-6 a default service path exists in which a path flows through the service providing module if it is not positively known that a data packet flow should not be passed through the service providing module.

Figure 2:
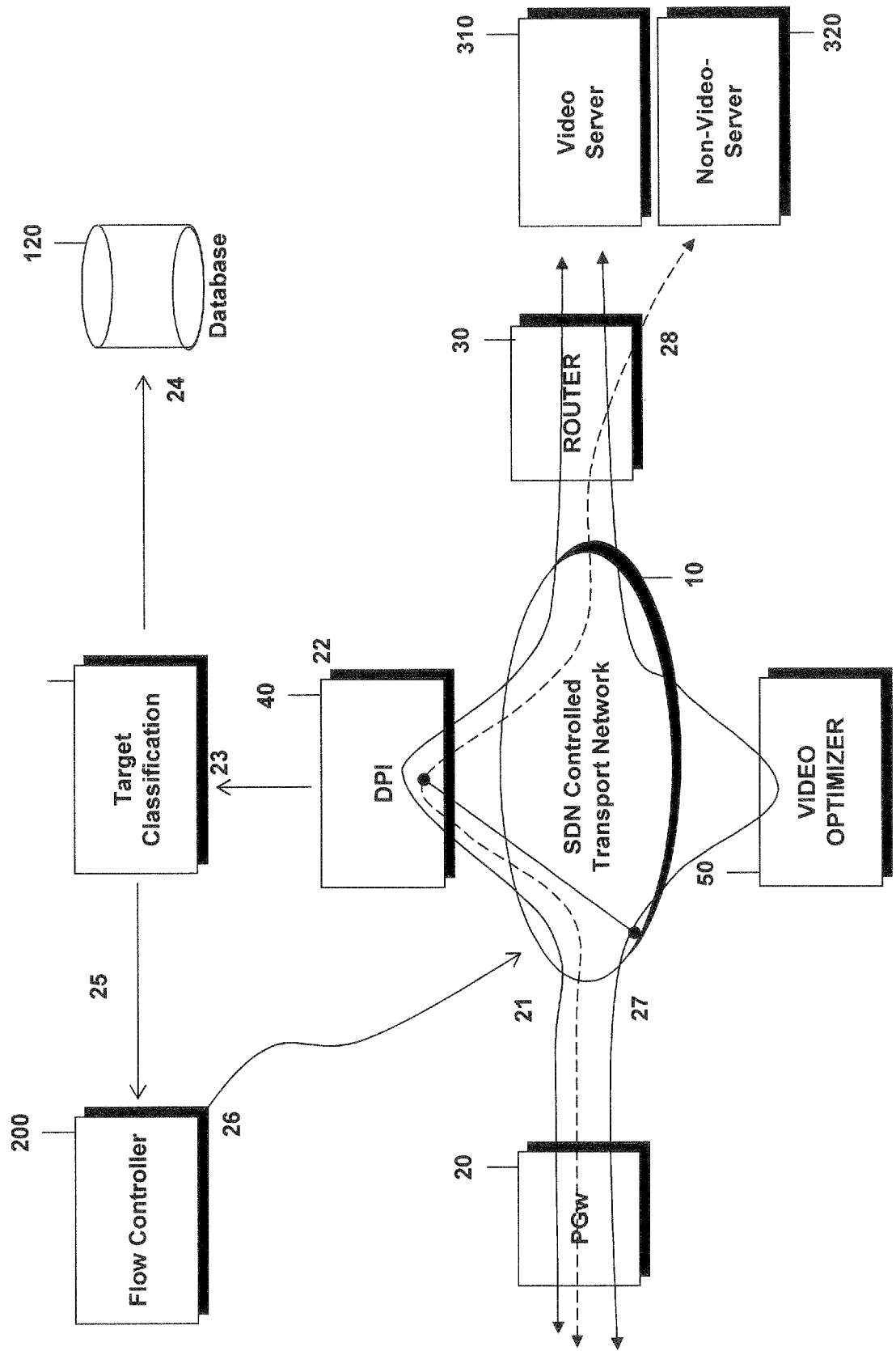
FIG. 2 schematically shows a more detailed view of a message exchange incorporating features of the invention between the components shown in FIG. 1 when it is detected that data packet flows to a new target node are classified as data packet flows for which the application of a service providing module is considered necessary.

In the following, reference is again made to FIGS. 2 and 3. In FIG. 2 the procedure of an active server selection is shown. In this embodiment it is assumed that the target node 310, 320 is not yet classified as a video server and that per default data packet flows are steered through the DPI 40, but not through the video optimizer 50. Only flows towards a target identified as video server are sent through the video optimizer 50. In FIG. 2 the SDN-controlled transport network 10 is controlled and programmed by a central flow controller 200 which is the controller of the SDN network. The packet inspection entity 40 is capable of performing deep packet inspection and is capable to identify video flows. The gateway 20 is a gateway connecting the user to the SDN-controlled network domain. The router 30 is a node to route traffic further towards the target node which can be an internet server. In the example shown, a video server is used as a target node.

The following steps are performed when a target node is not known as video server. In step 21 a default path is configured in the SDN-controlled transport network to send traffic along a path that includes the packet inspection entity 40 but bypasses the video optimizer. In step 22 the packet inspection entity 40 performs the packet inspection for every received flow. During this packet inspection the flow is identified and the data packet flow is classified whether or not a service providing module should be included in the path to the target node. The packet inspection entity thus generates flow classification data which include at least a flow classifier classifying the data packet flow, e.g. that the data packet flow is a video flow. The flow classification data furthermore include a flow identifier uniquely identifying the data packet flow for which the packet inspection was carried out and furthermore contains the target node address to which the data packet flow is addressed. In step 23 the flow classification data including the flow identifier is sent to a target node classification entity 100. The target node classification entity 100 classifies the target node based on the flow identifier and generates a first service classifier for the target node based on the flow classifier. By way of example, when the flow classification data indicate that the data packet flow is a video data flow, the target node classification entity classifies the destination node, here the video server 310 or non-video server 320 with a first service classifier which indicates which at least one service has to be applied to the data packet flow sent to the target node. The target node classification entity 100 then carries out different steps based on the flow classification. As indicated in step 24, it is checked in a classification database 120 whether information stored in the classification database for the identified target node has to be updated in view of the classification of the data packet flow. By way of example, when it is determined that the data packet flow is classified as a video flow, the target node classification entity 100 validates if the target node is known in the classification database 120 as a video server. If this is not the case, the target node is stored as a video server and an idle timer is started. The target node is added to the database 120. The case that the traffic is classified as a video server and the target is already known in the classification database as a video server is discussed in further detail below. As briefly explained in connection with FIG. 3, the idle timer of this target node will be updated. When the result of the flow classification is that the data packet flow is a non-video traffic and the target is not known in the database, the information is ignored. In another embodiment the classification database also contains entries for the target nodes if the path for the corresponding target node follows the default path. In the present example this means that the database would contain a second classifier indicating that server 320 is a non-video server. The flow classification then confirms this fact.

A further possibility is that the traffic is classified as a non-video traffic and the target is known as a video server, which will be discussed in connection with FIG. 3.

From the different options mentioned above, when a target node is not yet known as a video server, the target node address is stored as a video server in the classification database 120 and the SDN flow controller 200 is notified in step 25 that all flows towards the target node address should be treated as video traffic.

In step 26 the central flow controller 200 programs the transport network 10, here especially the forwarding elements which forward the data packet flows based on the instructions received from the central flow controller 200. The network or forwarding elements are programmed to steer existing flows to this target as before, meaning that the packet inspection entity is still included in the path and that the video optimizer is not included in the path. This information may be received from the packet inspection entity and the target node classification entity. The network is then programmed to steer new or successive data packet flows to this target node 310 through the video optimizer 50. Furthermore, the network is programmed in such a way that a subset of the flows to these target nodes is copied to the packet inspection entity 40. This can be done to monitor if the nature of the target does not change. In a content delivery network, a server such as the video server 310 or a non-video server 320 may behave as a video server for some time and as a download server for some other time. As symbolized by step 27, the new flow to the target node is steered through the video optimizer wherein a subset of the new flows is duplicated to the packet inspection entity in order to monitor whether the target node remains a video server or not.

As symbolized by step 28, any other flow to another target is steered as before, here along the default path through the packet inspection entity and bypassing the video optimizer 50.

Once a target node is identified as a video server, there is the need to supervise if the server is used all the time for video traffic. For this reason, a subset of the traffic is copied to the packet inspection entity 40 in step 27. It should be noted that the packet inspection entity is not included in the main path of the traffic to the target node identified as a video server in order to reduce the processing volume at the packet inspection entity 40. However, it is also possible to keep the packet inspection entity 40 within the traffic flow in order to avoid the need to select a subset of the flows and to copy the subset of the flows to the packet inspection entity. For the subset of the flows, only a certain percentage of the data packet flows to the target node are copied to the DPI, e.g. 10 percent of the flows so that the workload at the packet inspection entity is reduced.

Figure 3:
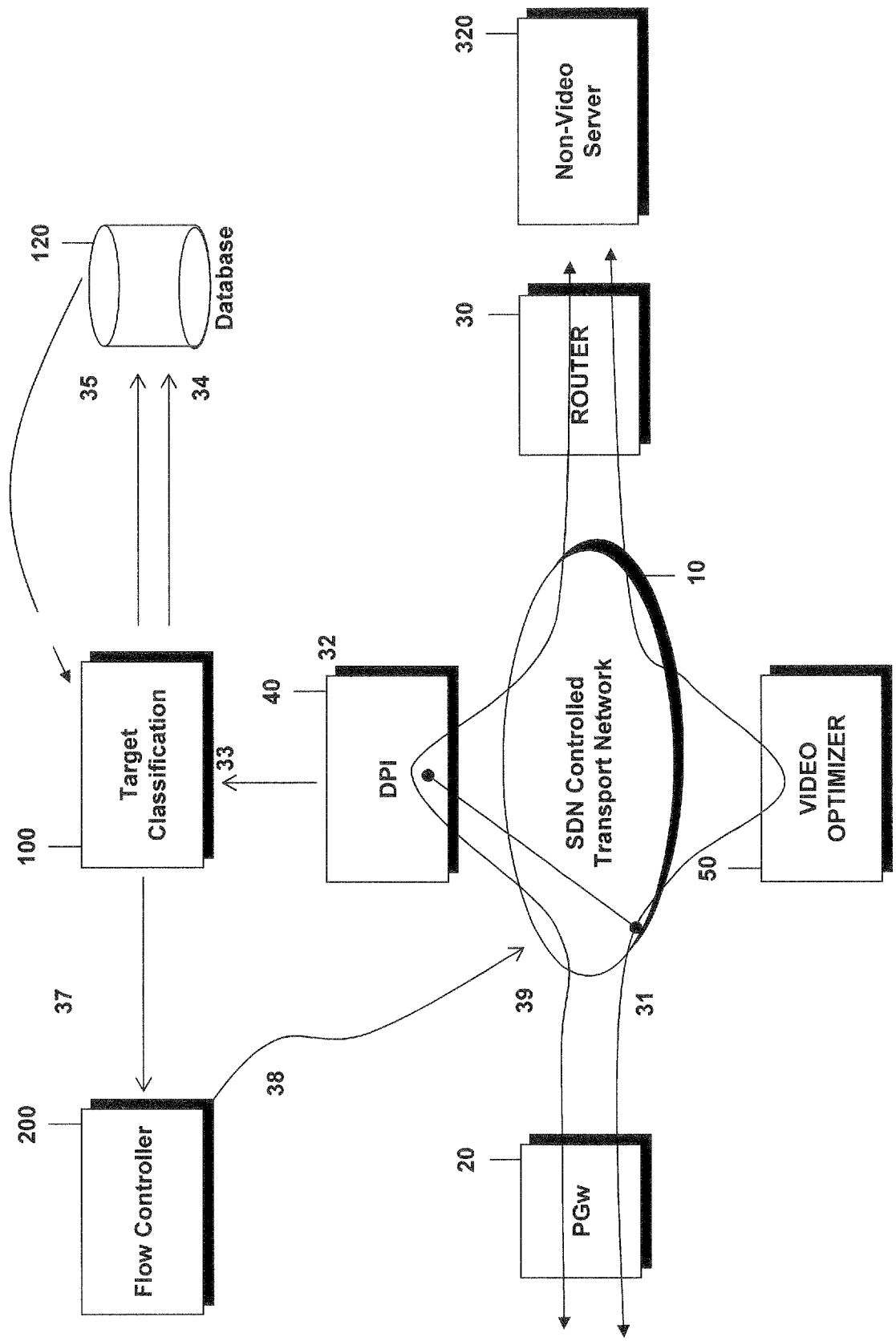
FIG. 3 schematically shows a message exchange for the system of FIG. 1 and FIG. 2 when the nature of the target node changes again and the flow steering should be converted back to the default flow steering.

In connection with FIG. 3 the removal of a target node following the situation explained in FIG. 2 is discussed in more detail. In this figure, the detailed steps are explained how the flow steering is modified when the traffic is sent to a target node known as a video server but which behavior changed and which acts now as non-video server.

In step 31, the traffic towards the target node known as a video server is treated as video traffic and sent through the video optimizer 50. A subset of the flow is copied and sent to the packet inspection entity 40 to monitor the traffic type as described above in connection with FIG. 2. In step 32 the packet inspection entity performs the deep packet inspection for every received flow. In step 33 the traffic classification and flow identifier is sent to the target node classification entity 100.

When the flow is specified as a video traffic and the target is known in the database as a video server then the idle time of the target node is updated (step 34). In step 35 when the flow is classified as a non-video traffic and the target node is known as a video server in the classification database 120 then the target node address is removed from the database. The process will then continue with step 37 discussed below. As symbolized by step 36, if a target node is not used for some time, then the idle timer expires and the storage/classification database 120 notifies the target node classification entity 100. With the idle timer it is possible to take into account the situation that the target node is only stored in the classification database as long as it is known that the target node is a target node for which the data packet flows do not follow the default path. If it is not confirmed by new data from the packet inspection entity that the target node is a node for which the corresponding data packet flows having the target node as a destination address should not follow the default path, the target node information is removed from the storage. In step 37 the target node classification entity 100 notifies the central flow controller 200 that the destination address of the target node shall not be used for video traffic any more. In step 38 the central flow controller then programs the transport network to send all data traffic flows towards this target through the DPI but by bypassing the video optimizer. In this embodiment the existing flows to the target node are impacted. However, the idle timer can be chosen long enough so that the number of impacted flows should be low. As symbolized by step 39, the flows towards the target node are steered through the packet inspection entity but not through the service providing module 50. This means that after step 39, the data packet flows are again steered through the network along the default path.

When the embodiments discussed above in connection with FIGS. 1 to 3 are examined in more detail, the following general rules can be extracted. The classification database 120 is updated wherein the updating comprises the step of storing the target node in the classification database 120 in connection with the first service classifier received from the packet inspection entity as a second service classifier when the classification database 120 does not contain information about the target node.

The target node with the second service classifier is, however, only stored in the classification database when the second service classifier of the target node indicates that the data packet flows through the service network to the target node do not follow the default service path through the service network. This was discussed inter alia above in connection with FIG. 2 and step 24.

Furthermore, in more general terms a timer is started when the database has been updated and when an expiration of the timer is detected, the central flow controller is informed to pass data packet flows to the target node along the default service path through the service network. The database 120 is updated and either the second service classifier has to be updated to present a flow steering along the default service path or the entry in the database is removed. The database is inter alia updated when the database also stores information on classification that a flow to a target node follows the default path. Here the database does not only contain entries for target nodes when the path to the corresponding target node does not follow the default path, but also contains entries when the flow to the corresponding node follows the default path.

When an expiration of a timer stored in the classification database in connection with a target node is detected, the target node is removed from the classification database and the central flow controller is informed to pass data packet flows to the target node along the default service path again through the service network. Furthermore, as discussed above in connection with FIG. 3, the updating of the classification database may comprise the step of updating the second service classifier stored in the classification database 120 in connection with the target node in accordance with the first service classifier. However, the second service classifier in the classification database is only updated if the second service classifier, before the update, indicates that data packet flows through the service network to the target node should not follow the default path through the service network and if the first classifier of the target node indicates that data packet flows to the target node should follow the default service path through the service network. As could be seen from FIG. 3 this could mean that the step of updating the second service classifier stored in the classification database comprises the step of removing the target node and the corresponding second service classifier from the database. Thus, the target node is stored in the classification database 120 if it is determined that data packet flows to the target node do not follow the default path through the service network.

From the above, it can also be concluded that it is determined whether the classification of the target node based on the first classifier and the second service classifier stored in the classification database in connection with the target node both indicate that data packet flows through the service network to the target node should not follow the default service path through the service network. If this is the case, the second service classifier stored in this classification database is kept unamended and the timer indicating that data packet flows to the target node should not follow the default path through the service network is updated.

In FIGS. 2 and 3 above, the default path through the service network indicates that data packets to the target node should not be passed through the service providing module and, as shown in FIG. 2, if this first service classifier of the target node indicates that data packet flows to the target node should pass the service providing module, the target node is stored in the classification database in connection with the second service classifier indicating that data packet flows transmitted to the target node should be passed through the service providing module in the service network. The flow command transmitted to the central flow controller 200 then indicates that successive data packet flows in the service network transmitted to the target node address should be passed through the service providing module. As discussed in connection with FIG. 3, if the default path through the service network indicates that data packets to the target node should not be passed through the service providing module and if the first service classifier of the target node indicates that data packet flows to the target node should not be passed through the service providing module and if the second classifier in the classification database indicates that the data packet flows transmitted to the target node should be transmitted through the service providing module, the second service classifier in the classification database 120 is updated accordingly to indicate that data packet flows to the target node should not be passed through the service providing module, wherein the flow command transmitted to the central flow controller indicates that successive data packet flows to the target node should not be transmitted through the service providing module anymore.

In connection with FIGS. 4-6, a situation will be explained in more detail when a default path exists in such a way that flows such as flow 7 in FIG. 4 with an unknown or unclassified target node address are sent through the packet inspection entity 40 and the video optimizer 50. When the packet inspection entity 40 identifies that the flow is not a video flow, then all subsequent flows with the same target node are bypassing the video optimizer as indicated by flow 8 of FIG. 4.

FIG. 5 shows the procedure of an active target removal in more detail. Here, it is assumed that the target node is not yet known to the target node classification entity 100. By default, flows are steered through the packet inspection entity 40 and the video optimizer 50. Once flows towards a target node are identified as non-video flows, the target is identified as non-video server and subsequent traffic to this target node is bypassing the video optimizer. As symbolized by step 51, by default, flows are steered in the transport network 10 along a predefined path passing the packet inspection entity 40 and the video optimizer 50. In step 52, the packet inspection entity performs deep packet inspection for every received flow. The packet inspection entity generates flow classification data including at least a flow classifier, a flow identifier and the target node address wherein in step 53 the traffic classification and flow identifier is sent to the target node classification entity 100. In step 54 based on the traffic classification different actions are taken. When the traffic is classified as non-video traffic, then the target classification entity validates if the target node is known as a non-video server. If the target node is not yet known as a non-video server, then the target node is stored as non-video server and the idle timer is started. The idle timer indicates a time period that has passed since the target node was classified as a non-video server or, in more general words, as a server for which a non-default service path is followed by the data packets transmitted to the server. If the traffic is classified as non-video traffic and the target is known as a non-video traffic server, the timer is updated as will be discussed further below.

When the data packet flow is classified as video traffic and the target is not known as non-video traffic, the information is ignored. When the traffic is classified as video traffic and the target is known as a non-video server, the target node may be removed from the storage as will be explained in further detail in connection with FIG. 6. In step 55, the target node classification entity 100 notifies the central flow controller 200 that all flows towards the target address should be treated as non-video flows when the target node has been identified as a non-video server 320. In step 56, the flow controller then programs the transport network in the following way. The forwarding elements are programmed to steer existing flows to this target as before, meaning that the packet inspection entity and the video optimizer are still included in the path. Information to apply the steering is received from the packet inspection entity 40 and the target node classification entity 100. The programming in step 56 furthermore contains the step of programming the network to steer new flows to this target by bypassing the video optimizer 50 and the packet inspection entity 40. Furthermore, the network is programmed to copy a subset of the flows to this target node 320 to the packet inspection entity 40. This is done to monitor if the nature of the target node changes, as a server in a content delivery network may behave as a download server for some time and as a video server for some other time.

In step 57, new flows to the target, identified as non-video server, are steered along a newly defined path bypassing the packet inspection entity 40 and the video optimizer 50. For supervision purpose, a subset of the flows is still copied to the packet inspection entity. As symbolized by step 58, flows to other targets are still steered as before along the default path through the video optimizer. Once a target is identified as a non-video server, there is a need to supervise if this server is used all the time for non-video traffic. For this reason, a subset of the traffic sent towards this target is copied to the packet inspection entity 40. Here, as in the embodiments described above, the packet inspection entity is removed from the main parts of the traffic in order to reduce the processing volume on the packet inspection entity 40. However, it should be understood that it is possible to keep that packet inspection entity within the traffic flow in order to avoid the need to select a subset of the flows and to copy this subset to the packet inspection entity.

FIG. 6 then shows in more detail the processing steps when the traffic is sent to a target node known as a non-video server. As discussed above and as symbolized by step 61, traffic towards a target node known as non-video server is treated as non-video traffic by bypassing the packet inspection entity 40 and the video optimizer 50. A subset of the flows is copied and sent to the packet inspection entity to monitor the traffic type. In step 62, deep packet inspection is performed. In step 63, the traffic classification including the flow identifier is sent to the target node classification entity 100. Based on the traffic classification, different actions are taken in step 64. When the flow is classified as a non-video flow and the target is known in the classification database as a non-video server, the idle timer of the target node is updated.

When the flow is classified as a video flow and the target node is known as non-video server, then the target node is removed from the storage and the steps continue with step 66 discussed below. In step 65, if a target is not used for some time, then the idle timer expires so that the storage/classification database 120 informs the target node classification entity 100. In step 66, the target node classification entity notifies the central flow controller 200 that a destination address should not be used for non-video traffic anymore when the target node is classified as video server again. The traffic to this target should be processed according to the default traffic steering. In step 67, the flow controller programs the transport network to send all traffic towards this target node through the packet inspection entity 40 and the video optimizer 50, which is the default path. Here, the existing flows to the target are impacted. If, however, the idle timer is selected long enough, the number of flows affected should be low. In step 68, the new flows towards the target are steered through the DPI and the video optimizer.

When studying the above embodiments, some more generalized rules can be detected. By way of example, if the default path through the service network indicates that data packets through the target node should be passed through the service providing module and if the first service classifier of the target node indicates that data packet flows to the target node should not be passed through the service providing module, the target node is stored in the classification database with a second service classifier indicating that data packet flows transmitted to the target node should not be passed through the service providing module in the service network. The flow command transmitted to the central flow controller then indicates that successive data packet flows in the service network transmitted to the target node address should not be passed through the service providing module.

Furthermore, if the default path through the service network indicates that data packet flows to the target node should be passed through the service providing module and if the first service classifier of the target node indicates that data packet flows to the target node should be passed through the service providing module and if the second classifier in the classification database 120 indicates that the data packet flow transmitted to the target node should not be transmitted through the service providing module, the second service classifier in the classification database is updated accordingly including the deletion of the entry to indicate that data packet flows transmitted to the target node should be passed through the service providing module and a flow command transmitted to the central flow controller that indicates that successive data packet flows to the target node should be transmitted through the service providing module again.

In the embodiments described above, the service classifier in the classification database is updated or amended when a single received first flow classifier is different from the information stored in the database. However, it might not be the best solution to declare the target node, e.g. immediately as a video server if a single traffic is classified as video traffic. It may happen that the target node processes video traffic and other traffic. Instead the target node classification entity can use a threshold. Only when the percentage of flows to the target node exceeds a threshold, then the target node is declared as a video server. In this situation, as long as video flows are received for the target node, but the target node is not yet declared to be a video server, the target is treated as a video server candidate. In a similar way, the change from a declared video server to a non-video server with the removal of the storage can depend on a threshold. Furthermore, a declaration of a non-video server and the removal of such a target node from the storage can be handled in a similar way. When the target node classification entity receives a plurality of classifiers for different data packet flows to the target node and only if the target node classification entity determines that a predefined amount of the received flow classifiers, e.g. a predetermined amount of the received flow classifier per time unit, indicates that same type of flow classifier, the first service classifier for the target node is generated and it is checked whether the classification database has to be updated based on the generated first service classifier.

Furthermore, some general rules can be extracted from the above examples for the central flow controller 200. The flow command received from the target node classification entity can contain the flow identifier and the information that a path for the data packet flow identified by the flow identifier through the service network should not be amended, wherein the forwarding elements in the service network are programmed in such a way that the path of the data packet flow through the service network identified with the received flow identifier remains unchanged, however the forwarding elements are programmed to forward the data packet flows of successive data packet flow to the target node on the updated path. This again means that the path of the flow which is used as a basis for the determination of the target node classification is not amended.

By way of example, when the first service classifier received in the flow command indicates that data packet flows to the target node should be transmitted through the service providing module, the update path through the service network is adapted in such a way that the data packet flows to the target node pass the service providing module and the forwarding elements are programmed in such a way that successive data packet flows to the target are passed through the service providing module. However, when the first service classifier received in the flow command indicates that data packet flows to the target node should not be passed through the service providing module, the updated path through the service network is adapted in such a way that data packet flows to the target node bypass the service providing module and the forwarding elements are programmed in such a way that successive data packet flows to the target node bypass the service providing module.

As explained above, a default path for the data packet flow through the service network exists and if it is determined based on the received first service classifier that the data packet flows to the target node should not follow the default path and should bypass the flow classification entity, at least one forwarding element forwarding the data packet flow to the target node is instructed to forward a part of the data packet flows transmitted to the target node through the flow classification entity.

Figure 7:
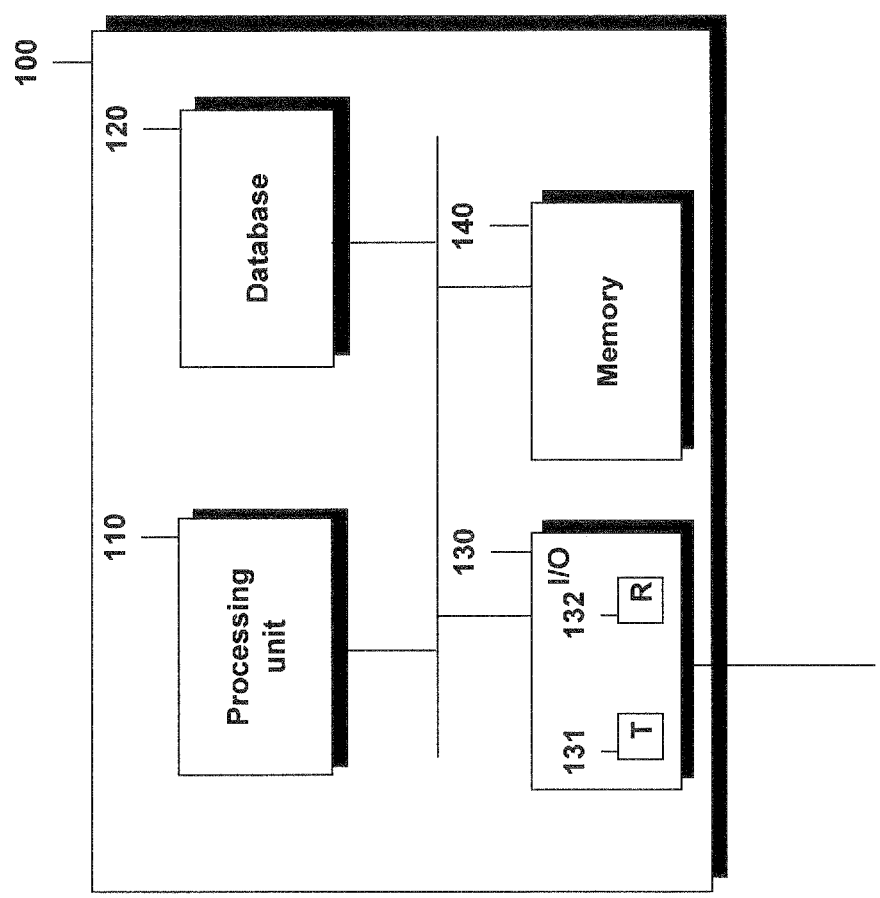
FIG. 7 schematically illustrates structures of a target node classification entity according to an embodiment of the invention.

FIG. 7 illustrates exemplary structures for implementing a target node classification entity 100 which operates in accordance with the above described concepts. As shown in FIG. 7, the target node classification entity comprises an input/output or interface unit 130 comprising a transmitter 131 and a receiver 132. The input/output unit is provided for communicating with other entities or nodes such as the packet inspection entity 40 or the central flow controller 200. A processing unit 110 comprising one or more processors is provided which is responsible for the operation of the target node classification unit and is adapted to classify the target node, to generate the first service classifier, to check whether the classification database 120 is in agreement with the first service classifier etc. Furthermore, the processing unit 110 may generate the flow command that is transmitted to the central flow controller 200. The processing unit is adapted to initiate all the procedures discussed above, in which the target node classification entity 100 is involved. In the embodiment shown in FIG. 7, the database 120 is indicated as being included into the target node classification entity 100. It should be understood that the database 120 may also be located outside the target node classification entity. Furthermore, a memory 140 is provided, which may be a read-only memory, a flash read-only memory, a random-access memory, a mass storage, a hard disk or a solid-state disk or the like. The memory 140 includes suitable program code to be executed by the processing unit so as to implement that above described functionalities.

It is to be understood that structures as illustrated in FIG. 7 and also the structures of the flow controller shown in FIG. 8 discussed below are merely schematic and that the target node classification entity 100 or the central flow controller 200 may actually include further components which, for the sake of clarity, have not been illustrated. Also it is to be understood that the different functional modules shown in FIGS. 7 and 8 need not to be incorporated into separate entities as indicated in FIGS. 7 and 8.

Figure 8:
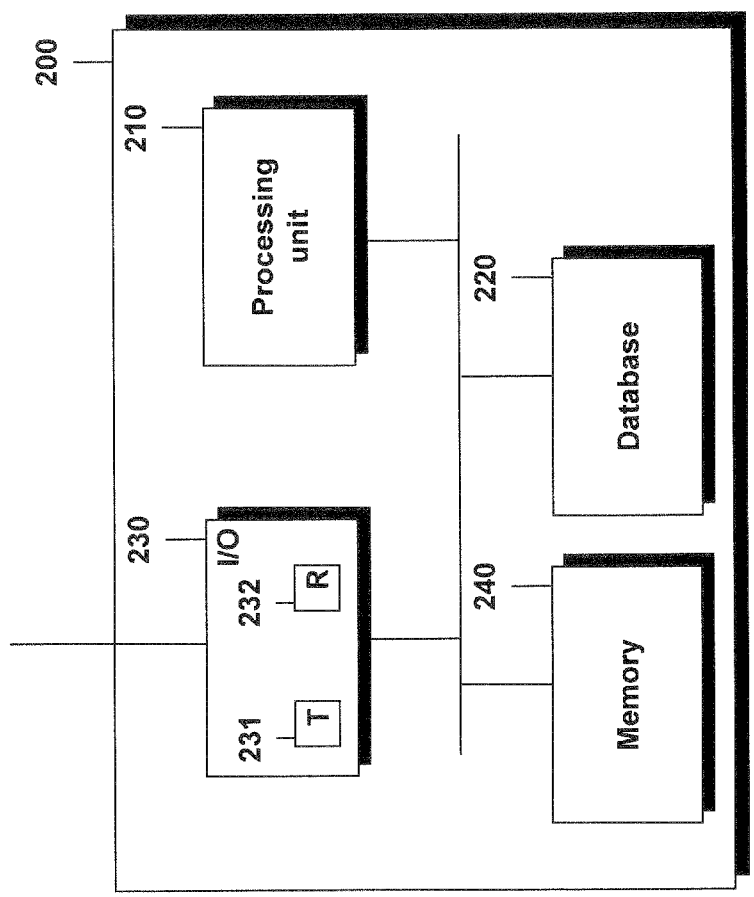
FIG. 8 schematically illustrates structures of a central flow controller according to an embodiment of the invention which controls the flow of data packets in a service network.

FIG. 8 shows a schematic exemplary structure of the central flow controller 200, which comprises an input/output unit 230 with a transmitter 231 and a receiver 232 for communicating with other entities, such as the forwarding elements of the service network or the target node classification entity 100. A processing unit 210 with one or more processors is provided adapted to control the central flow controller in such a way that the above described functionalities of the central flow controller can be carried out. The processing unit may inter alia determine an updated path for the successive data packet flows to the target node in accordance with the received flow command. A database 220 may be provided in which information about the service providing network may be stored, e.g. information such as which forwarding elements are provided etc. A memory 240 is provided which can store program code which, when run by the processing unit 210, implements the above described functionalities of the central flow controller.

The invention is advantageously used in connection with data packet flows where the flow type cannot be identified at connection setup, but which for example requires heuristic analysis. Only when the analyses of the data packets are carried out, it is possible to determine whether a service needs to be applied or not. However, the removal of a service is normally not possible without interrupting the end-to-end connection so that it is called the non-TCP transparent service. This concept is explained in more detail in connection with FIG. 9.

Figure 9:
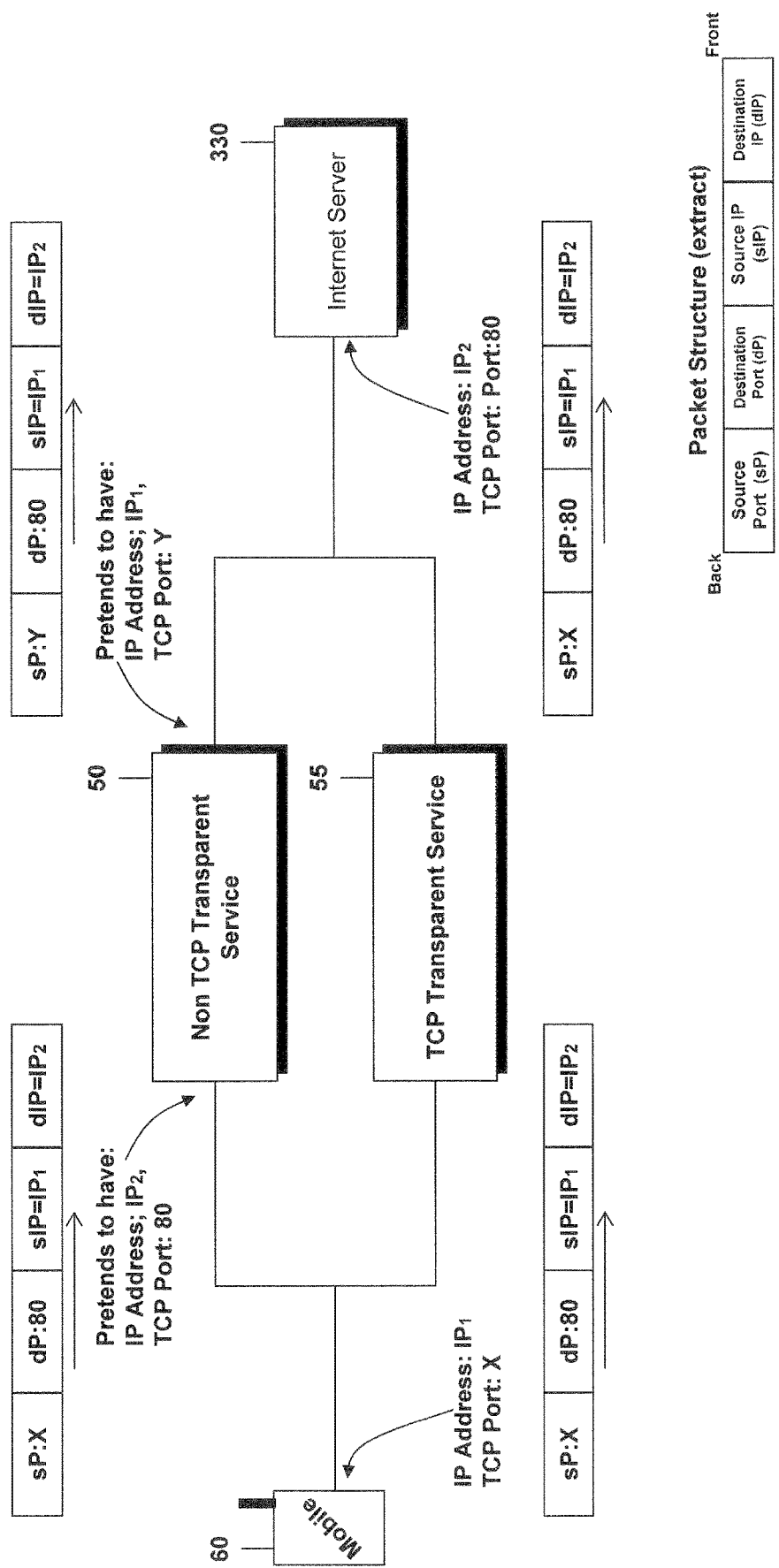
FIG. 9 schematically illustrates the handling of addresses in services which are TCP-transparent and non-TCP-transparent.

A service within a service chain intercepts the TCP connection that an end user establishes with the target node, typically a server in the internet. The interception is done in a way that the service node manages two different TCP connections, one towards the end user and one towards the target node. In the embodiment in FIG. 9, the end user is a mobile phone 60. The TCP connection is identified by the source IP address, the source TCP port and the destination IP address and the destination TCP port. In this identifier, the non-TCP transparent service providing module 50 can modify the port number used by the mobile entity 60. The IP addresses are fixed because they are used as identifier of the end nodes. The port number of the internet server is typically 80, which is used by http server nodes. FIG. 9 shows the behaviour of the non-TCP transparent service providing module 50 in the upper part. The data packet flow from the mobile phone 60 to the target node 330 has a source TCP port X, a destination port 80, the source IP address being IP1, the destination IP address being IP2. The non-transparent service providing module pretends to have the IP address IP2 and the TCP port 80 at its input and pretends to have the IP address IP1 with the TCP port Y at its output. As can be seen in the upper part, the source port in the packets from the mobile phone 60 to the target node 330 is modified. Thus, the IP five tuple of the IP flow is amended. If the service providing module 50 is removed from the flow, the target node will not identify the packets as belonging to the same data packet flow as the IP five tuple has changed as the source port address has changed. In a TCP transparent service providing module 55 shown in the lower part of FIG. 9, this is not the case.

Summarizing, the present invention especially improves the utilization of non-transparent TCP service providing modules. As a consequence, the percentage of data packet flows that are transmitted through the required service providing modules and to which a service should be applied is increased even if the flow requires heuristic analysis to identify the type of flow. In other words, the number of data packet flows transmitted through a service providing module, but to which no service is applied is minimized. With the exception of the learning period, where the classification of a target node is carried out based on the analysis of one or several flows to the corresponding target, data packet flows applicable for service are sent to the service providing module or data packets flows for which the application of the service providing module is not considered necessary bypass the service providing module.

The invention claimed is:

1. A method, performed by a target node classification entity, to control an application of a service providing module to a data packet flow, wherein the data packet flow is transmitted to a target node through a service network where the service providing module comprising a processor configured to apply a service to the data packet flow, the method comprising:
   receiving, from a flow classification entity, flow classification data about the data packet flow, the flow classification data including at least:
      a flow classifier classifying the data packet flow;
      a flow identifier uniquely identifying the data packet flow; and
      a target node address to which the data packet flow is addressed;

classifying the target node based on the flow classifier contained in the received flow classification data,
   wherein a first service classifier is generated for the target node based on the flow classifier, and wherein the first service classifier indicates at least one service to be applied to the data packet flow;
   checking whether a classification database has to be updated based on the first service classifier of the target node, the classification database storing, for different target nodes, whether the at least one service has to be applied to data packet flows to the corresponding target node; and
   in response to determining that information in the classification database has to be updated:
   generating a flow command for a central flow controller which controls the data packet flows through the service network, wherein the generated flow command contains information that successive data packet flows in the service network transmitted to the target node address should be passed through the service network in accordance with the generated first service classifier of the target node; and
   transmitting the generated flow command to the central flow controller.

2. The method of claim 1: further comprising updating the classification database,
   wherein the updating comprises storing the target node in the classification database in connection with the first service classifier as a second service classifier when the classification database does not contain information about the target node; and
   wherein the target node with the second service classifier is only stored in the classification database when the second service classifier of the target node indicates that the data packet flows through the service network to the target node do not follow a default service path through the service network.

3. The method of claim 2: further comprising starting a timer when the classification database has been updated,
   wherein, when an expiration of the timer is detected, the central flow controller is informed to pass the data packet flows to the target node along the default service path through the service network.

4. The method of claim 2:
   wherein, if the default service path through the service network indicates that the data packet flows to the target node should not be passed through the service providing module and if the first service classifier of the target node indicates that the data packet flows to the target node should pass the service providing module, the target node is stored in the classification database in connection with the second service classifier indicating that the data packet flows transmitted to the target node should be passed through the service providing module in the service network; and
   wherein the generated flow command transmitted to the central flow controller indicates that the successive data packet flows in the service network transmitted to the target node address should be passed through the service providing module.

5. The method of claim 2: wherein, if the default service path through the service network indicates that the data packet flows to the target node should be passed through the service providing module and if the first service classifier of the target node indicates that the data packet flows to the target node should not be passed through the service providing module, the target node is stored in the classification database with the second service classifier indicating that the data packet flows transmitted to the target node should not be passed through the service providing module in the service network; and wherein the flow command transmitted to the central flow controller indicates that successive data packet flows in the service network transmitted to the target node address should not be passed through the service providing module.

6. The method of claim 1, wherein the generated flow command contains information that a path for the data packet flow identified by the flow identifier through the service network should not be amended.

7. The method of claim 1: further comprising updating the classification database, wherein the updating comprises updating a second service classifier stored in the classification database in connection with the target node in accordance with the first service classifier; and wherein the second service classifier in the classification database is only updated if both: the second service classifier, before the update, indicates that the data packet flows through the service network to the target node should not follow a default service path through the service network; and the first service classifier of the target node indicates that the data packet flows to the target node should follow the default service path through the service network.

8. The method of claim 7, wherein the updating of the second service classifier stored in the classification database comprises removing the target node and the corresponding second service classifier from the classification database.

9. The method of claim 7:

wherein, if the default service path through the service network indicates that the data packet flows to the target node should not be passed through the service providing module and if the first service classifier of the target node indicates that the data packet flows to the target node should not be passed through the service providing module and if the second service classifier in the classification database indicates that the data packet flows transmitted to the target node should be transmitted through the service providing module, the second service classifier in the classification database is updated accordingly to indicate that the data packet flows to the target node should not be passed through the service providing module; and wherein the generated flow command transmitted to the central flow controller indicates that the successive data packet flows to the target node should not be transmitted through the service providing module anymore.

10. The method of claim 7:

wherein, if the default service path through the service network indicates that the data packet flows to the target node should be passed through the service providing module and if the first service classifier of the target node indicates that data packet flows to the target node should be passed through the service providing module and if the second classifier in the classification database indicates that the data packet flows transmitted to the target node should not be transmitted through the service providing module, the second service classifier in the classification database is updated accordingly to indicate that data packet flows transmitted to the target node should be passed through the service providing module; and wherein the flow command transmitted to the central flow controller indicates that the successive data packet flows to the target node should be transmitted through the service providing module again.

11. The method of claim 1: further comprising determining whether the classification of the target node based on the first service classifier and a second service classifier stored in the classification database in connection with the target node both indicate that the data packet flows through the service network to the target node should not follow a default service path through the service network; and in response to the determining be in the affirmative, the second service classifier stored in the classification database is kept unamended and a timer indicating that the data packet flows to the target node should not follow the default service path through the service network is updated.

12. The method of claim 1, wherein, in response to an expiration of a timer stored in the classification database in connection with a target node being detected:

the target node is removed from the classification database, and the central flow controller is informed to pass the data packet flows to the target node along a default service path through the service network.

13. The method of claim 1, wherein a plurality of flow classifiers are received for different data packet flows to the target node, and only if a predefined amount of the received plurality of flow classifiers indicate the same type of flow classifier, then:

the first service classifier is generated for the target node; and the checking, whether the classification database has to be updated based on the generated first service classifier, occurs.

14. A target node classification entity configured to control an application of a service providing module to a data packet flow, wherein the data packet flow is transmitted to a target node through a service network where the service providing module comprising a processor configured to apply a service to the data packet flow, the target node classification entity comprising:

a receiver configured to receive, from a flow classification entity, flow classification data about the data packet flow, the flow classification data including at least:

a flow classifier classifying the data packet flow;

a flow identifier uniquely identifying the data packet flow; and a target node address to which the data packet flow is addressed; processing circuitry configured to:

classify the target node based on the flow classifier contained in the received flow classification data;

generate a first service classifier for the target node based on the flow classifier, wherein the first service classifier indicates at least one service to be applied to the data packet flow;

check whether a classification database has to be updated based on the first service classifier of the target node, the classification database storing, for different target nodes, whether the at least one service has to be applied to data packet flows to the corresponding target node; and in response to determining that information in the classification database has to be updated, generate a flow command for a central flow controller which controls the data packet flows through the service network, wherein the generated flow command contains information that successive data packet flows in the service network transmitted to the target node address should be passed through the service network in accordance with the generated first service classifier of the target node; and a transmitter configured to transmit the generated flow command to the central flow controller.

15. The target node classification entity of claim 14:
wherein the receiver is further configured to receive a plurality of flow classifiers for different data packet flows to the target node; and
wherein the processing circuitry is configured such that, only if the processing circuitry determines that a predefined amount of the received plurality of flow classifiers indicates the same type of flow classifier, does the processing circuitry generate the first service classifier for the target node, and check whether the classification database has to be updated based on the generated first service classifier.

16. A method for controlling, performed by a central flow controller, data packet flows in a service network in which service providing modules comprising a processor configured to apply services to the data packet flows, wherein the data packet flows are transmitted through the service network to a target node based on a first service classifier of the target node, the method comprising:
receiving, from a target node classification entity, a flow command, the flow command containing information that successive data packet flows in the service network transmitted to the target node should be passed through the service network in agreement with the first service classifier of the target node contained in the received flow command,
wherein the first service classifier is comprised in the received flow command, wherein the first service classifier indicates at least one service to be applied to the data packet flows, and wherein the first service classifier is generated for the target node by the target node classification entity;
determining, based on the received flow command, an updated path for the successive data packet flows to the target node in accordance with the received flow command; and
programming forwarding elements in the service network which forward the data packet flows in the service network in such a way that the successive data packet flows to the target node follow the updated path.

17. The method of claim 16: wherein the flow command contains a flow identifier and information that a path for the data packet flows identified by the flow identifier through the service network should not be amended; and
wherein the forwarding elements in the service network are programmed in such a way that the path of the data packet flows through the service network identified with the received flow identifier remains unchanged.

18. The method of claim 16, wherein, when the first service classifier received in the flow command indicates that the data packet flows to the target node should be transmitted through a service providing module:
the updated path through the service network is adapted in such a way that the data packet flows to the target node pass the service providing module; and
the forwarding elements are programmed in such a way that the successive data packet flows to the target node pass through the service providing module.

19. The method of claim 16, wherein, when the first service classifier received in the flow command indicates that the data packet flows to the target node should not be passed through a service providing module:
the updated path through the service network is adapted in such a way that the data packet flows to the target node bypass the service providing module; and the forwarding elements are programmed in such a way that the successive data packet flows to the target node bypass the service providing module.

20. The method of claim 16: wherein a default path for the data packet flows through the service network exists; and wherein, if it is determined, based on the received first service classifier, that the data packet flows to the target node should not follow the default path and should bypass a flow classification entity, at least one forwarding element forwarding the data packet flows to the target node is instructed to forward a part of the data packet flows transmitted to the target node through the flow classification entity.

21. A central flow controller configured to control data packet flows in a service network in which service providing modules comprising a processor configured to apply services to the data packet flows,
wherein the data packet flows are transmitted through the service network to a target node based on a first service classifier of the target node, the central flow controller comprising:
a receiver configured to receive, from a target node classification entity, a flow command, the flow command containing information that successive data packet flows in the service network transmitted to the target node should be passed through the service network in agreement with the first service classifier of the target node contained in the received flow command, wherein the first service classifier is comprised in the received flow command, wherein the first service classifier indicates at least one service to be applied to the data packet flows, and wherein the first service classifier is generated for the target node by the target node classification entity; and
processing circuitry configured to:
determine, based on the received flow command, an updated path for the successive data packet flows to the target node in accordance with the received flow command; and
program forwarding elements in the service network which forward the data packet flows in the service network in such a way that the successive data packet flows to the target node follow the updated path.

22. A computer program product stored in a non-transitory computer readable medium for controlling an application of a service providing module to a data packet flow, wherein the data packet flow is transmitted to a target node through a service network where the service providing module comprising a processor configured to apply a service to the data packet flow, the computer program product comprising software instructions which, when run on processing circuitry of a target node classification entity, cause the target node classification entity to:
receive, from a flow classification entity, flow classification data about the data packet flow, the flow classification data including at least:
a flow classifier classifying the data packet flow;
a flow identifier uniquely identifying the data packet flow; and
a target node address to which the data packet flow is addressed;

classify the target node based on the flow classifier contained in the received flow classification data, wherein a first service classifier is generated for the target node based on the flow classifier, and wherein the first service classifier indicates at least one service to be applied to the data packet flow; check whether a classification database has to be updated based on the first service classifier of the target node, the classification database storing, for different target nodes, whether the at least one service has to be applied to data packet flows to the corresponding target node; and in response to determining that information in the classification database has to be updated:

generate a flow command for a central flow controller which controls the data packet flows through the service network, wherein the generated flow command contains information that successive data packet flows in the service network transmitted to the target node address should be passed through the service network in accordance with the generated first service classifier of the target node; and transmit the generated flow command to the central flow controller.

23. A computer program product stored in a non-transitory computer readable medium for controlling data packet flows in a service network in which service providing modules comprising a processor configured to apply services to the data packet flows, wherein the data packet flows are transmitted through the service network to a target node based on a first service classifier of the target node, the computer program product comprising software instructions which, when run on processing circuitry of a central flow controller, causes cause the central flow controller to:

receive, from a target node classification entity, a flow command, the flow command containing information that successive data packet flows in the service network transmitted to the target node should be passed through the service network in agreement with the first service classifier of the target node contained in the received flow command, wherein the first service classifier is comprised in the received flow command, wherein the first service classifier indicates at least one service to be applied to the data packet flows, and wherein the first service classifier is generated for the target node by the target node classification entity;

determine, based on the received flow command, an updated path for the successive data packet flows to the target node in accordance with the received flow command; and program forwarding elements in the service network which forward the data packet flows in the service network in such a way that the successive data packet flows to the target node follow the updated path.

* * * * *